(12) United States Patent
Ogren

(10) Patent No.: US 9,833,971 B2
(45) Date of Patent: *Dec. 5, 2017

(54) ASSEMBLY FOR CREATING CUSTOM STRUCTURES AND COUPONS FROM PRINTABLE BLANK SHEETS

(71) Applicant: Blank Acquisition, LLC, Brooklyn Park, MN (US)

(72) Inventor: Andrew R. Ogren, Woodbury, MN (US)

(73) Assignee: Blank Acquisition, LLC, Brooklyn Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/833,888

(22) Filed: Aug. 24, 2015

(65) Prior Publication Data

US 2017/0057202 A1 Mar. 2, 2017

(51) Int. Cl.
| | |
|---|---|
| *B32B 7/12* | (2006.01) |
| *B32B 27/36* | (2006.01) |
| *B32B 29/00* | (2006.01) |
| *B32B 3/26* | (2006.01) |
| *B65D 1/00* | (2006.01) |
| *B65D 23/14* | (2006.01) |
| *B65D 81/38* | (2006.01) |
| *B65D 5/42* | (2006.01) |
| *G10K 11/08* | (2006.01) |
| *G09F 1/00* | (2006.01) |

(Continued)

(52) U.S. Cl.
CPC ............... *B32B 7/12* (2013.01); *B32B 3/266* (2013.01); *B32B 27/36* (2013.01); *B32B 29/002* (2013.01); *B65D 1/00* (2013.01); *B65D 5/4216* (2013.01); *B65D 5/4233* (2013.01); *B65D 23/14* (2013.01); *B65D 81/3876* (2013.01); *G09F 1/00* (2013.01); *G09F 1/02* (2013.01); *G09F 1/06* (2013.01); *G10K 11/08* (2013.01); *B32B 2307/748* (2013.01); *B32B 2307/75* (2013.01); *B32B 2451/00* (2013.01); *B65D 2203/00* (2013.01)

(58) Field of Classification Search
CPC  B32B 7/12; B32B 3/266; B32B 27/36; B32B 29/002; B32B 2307/748; B32B 2307/75; B32B 2451/00; Y10T 428/14; Y10T 428/1486; Y10T 428/149; Y10T 428/1495; B65D 23/14; B65D 81/3876; B65D 5/4216; B65D 5/4233; B65D 1/00; B65D 2203/00; G10K 11/08; G09F 1/06; G09F 1/00; G09F 1/02
See application file for complete search history.

(56) References Cited

U.S. PATENT DOCUMENTS

| | | |
|---|---|---|
| 3,598,303 A | 8/1971 | Folz |
| 4,735,356 A | 4/1988 | Engel |
| 5,071,062 A | 12/1991 | Bradley et al. |

(Continued)

OTHER PUBLICATIONS

Relyco, DigiPOP Packaging Solutions, http://www.relyco.com/en/Products/DigiPOP%20Packaging%Solutions.aspx, May 21, 2012, 6 pages.

*Primary Examiner* — Patricia L Nordmeyer
(74) *Attorney, Agent, or Firm* — Kinney & Lange, P.A.

(57) ABSTRACT

A printable blank sheet comprises a sheet with a top substrate and a bottom layer, a dry lift adhesive connecting the top substrate to the bottom layer, an object with an intricate shape cut into the sheet, and a coupon cut into the sheet.

17 Claims, 17 Drawing Sheets

(51) Int. Cl.
*G09F 1/02* (2006.01)
*G09F 1/06* (2006.01)

(56) References Cited

U.S. PATENT DOCUMENTS

| | | |
|---|---|---|
| 5,538,288 A | 7/1996 | Heath |
| 5,571,587 A | 11/1996 | Bishop et al. |
| 5,853,837 A | 12/1998 | Popat |
| 6,117,061 A | 9/2000 | Popat et al. |
| 6,257,404 B1 | 7/2001 | Tracy et al. |
| 6,279,821 B1 | 8/2001 | Kubitsky et al. |
| 6,294,237 B1 * | 9/2001 | Popat ................ G09F 3/10 283/101 |
| 6,440,050 B1 | 8/2002 | Capparelli et al. |
| 6,845,864 B2 | 1/2005 | Taw et al. |
| 6,966,483 B2 | 11/2005 | Manninen |
| 2005/0082356 A1 | 4/2005 | Shadrach |
| 2005/0123705 A1 * | 6/2005 | Dronzek, Jr. ............ B32B 7/06 428/40.1 |
| 2008/0000118 A1 | 1/2008 | Suzuki |
| 2014/0069994 A1 * | 3/2014 | Carroll ................ B31B 1/00 229/237 |
| 2015/0266261 A1 * | 9/2015 | Carroll ................ B32B 3/266 101/482 |
| 2016/0015197 A1 * | 1/2016 | Jacobs ............... A47G 19/2227 428/41.8 |

* cited by examiner

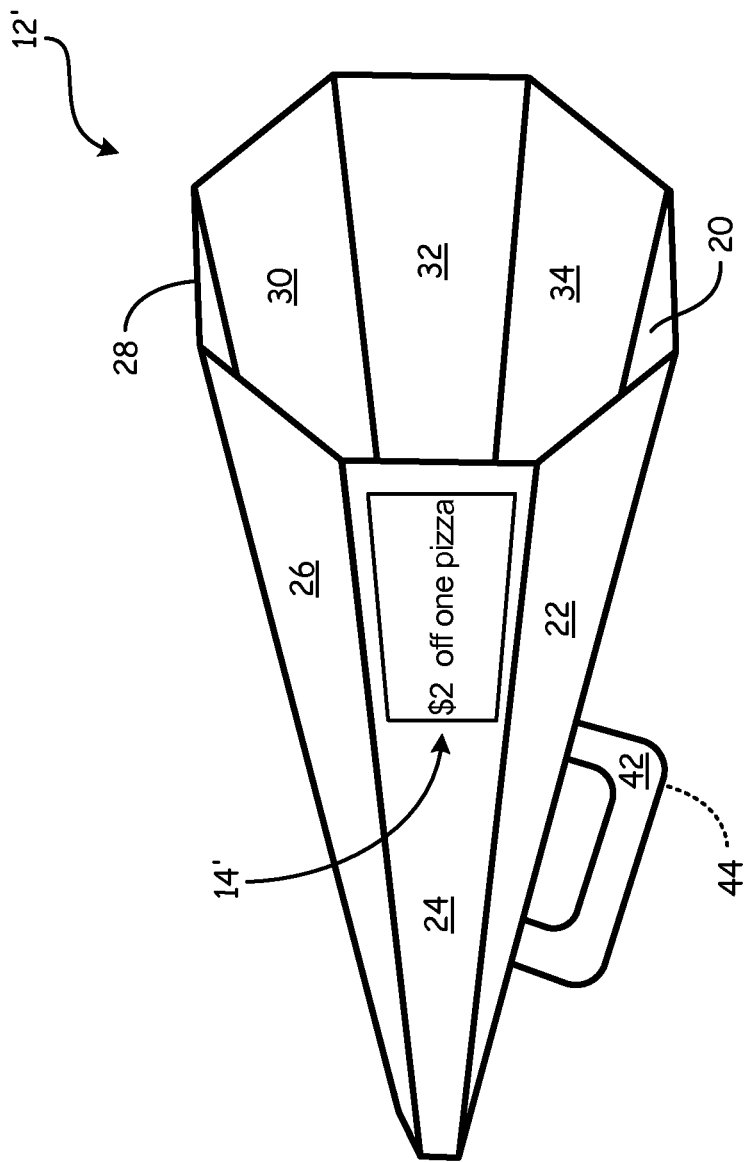

ASSEMBLY FOR CREATING CUSTOM STRUCTURES AND COUPONS FROM PRINTABLE BLANK SHEETS

BACKGROUND

The present invention relates to printable blank sheets, and in particular, to printable blank sheets that contain an object capable of being formed into a custom structure and a coupon.

Custom print materials have become a common way for businesses to market themselves. Custom print materials that are typically used in advertising include two-dimensional products like postcards, flyers and door hangers, as well as three-dimensional products like golf ball boxes, candy boxes and pop-up calendars. Typically, custom print materials are sent to print shops that specialize in preparing custom print materials, as the materials have had to be printed and assembled by specialized machines. As a result, having custom print materials made can be costly and time-consuming. Further, specialty print shops typically require custom print materials to be ordered in large amounts.

Some printable blank templates are currently available for creating custom print materials without having to send them to print shops. These templates are die-cut with perforations and scored lines. The perforations surround the desired shape of the object and the scored lines indicate where the object should be folded if the object is a three-dimensional structure. The drawback to the currently available die-cut templates is that it is hard to detach the desired object from the excess sheet when the objects have an intricate shape. Trying to separate the perforated lines often causes tearing of the object, which affects the strength and image of the resulting structure. The perforations surrounding the object can also leave rough edges on the structure where the perforations were torn apart. Further, it is time consuming to remove the objects from the sheet, especially if taking care not to tear the object as it is removed from the sheet.

SUMMARY

A printable blank sheet comprises a sheet with a top substrate and a bottom layer, a dry lift adhesive connecting the top substrate to the bottom layer, an object with an intricate shape cut into the sheet, and a coupon cut into the sheet.

A printable blank sheet of material comprises a sheet with a top substrate and a bottom layer, a dry lift adhesive connecting the top substrate to the bottom layer, cut lines in the sheet that extend through the top substrate and the dry lift adhesive but not through the bottom layer, a first object with an intricate shape cut into the top substrate with a periphery defined by the cut lines, and a second object cut into the top substrate with a periphery defined by the cut lines. The first object and the second object can be removed from the sheet by separating the first object and the second object from the bottom layer along the dry lift adhesive.

BRIEF DESCRIPTION OF THE DRAWINGS

FIG. 5 is a perspective assembled view of a megaphone with a coupon superimposed on the megaphone.

DETAILED DESCRIPTION

In general, the present disclosure describes a printable blank sheet that is capable of being printed on to form custom structures and coupons. The printable blank sheet includes a plurality of layers, including a printable substrate, a dry lift adhesive, and a film layer. A periphery of an object with an intricate shape and a coupon can be defined in the printable blank sheet by cutting through the printable substrate and the dry lift adhesive but not through the film layer. The dry lift adhesive holds the printable substrate on the film layer after the object has been cut out of the printable substrate so that the printable blank sheet can be run through a printer. After the printable blank sheet has been printed on, the object and the coupon can be separated from the film layer along the dry lift adhesive. A majority of the dry lift adhesive will remain on the film layer after the object and coupon have been removed. The dry lift adhesive has a dry release so none of the object, the coupon, and the film layer will have a sticky residue on them after the object and the coupon are separated from the film layer. The object can then be assembled by folding along scored lines and using tabs and die-cuts to assemble the object.

A printable blank sheet with a customizable object and coupon is advantageous. First, the customizable object allows businesses to print their indicia onto the object and promote their business' goods or services to potential customers. Second, the coupon allows for another route of advertisement for a business using the present printable blank sheet. Third, the inclusion of a coupon also allows for strategic partnering between two parties. For example, a school could purchase a printable blank sheet with a megaphone to sell at a sporting event. In order to cover the cost of production, the school could partner with a business to sponsor the megaphones. The business could promote itself using the coupon portion of the printable blank sheet while the school could reduce its cost of production for the custom megaphone. A customer could purchase the printed sheet from the school, detach the megaphone from the sheet, assemble it and use it at, for example, a school athletic event. Later, the customer could use the coupon to purchase an item from the sponsor business.

Figure 1:
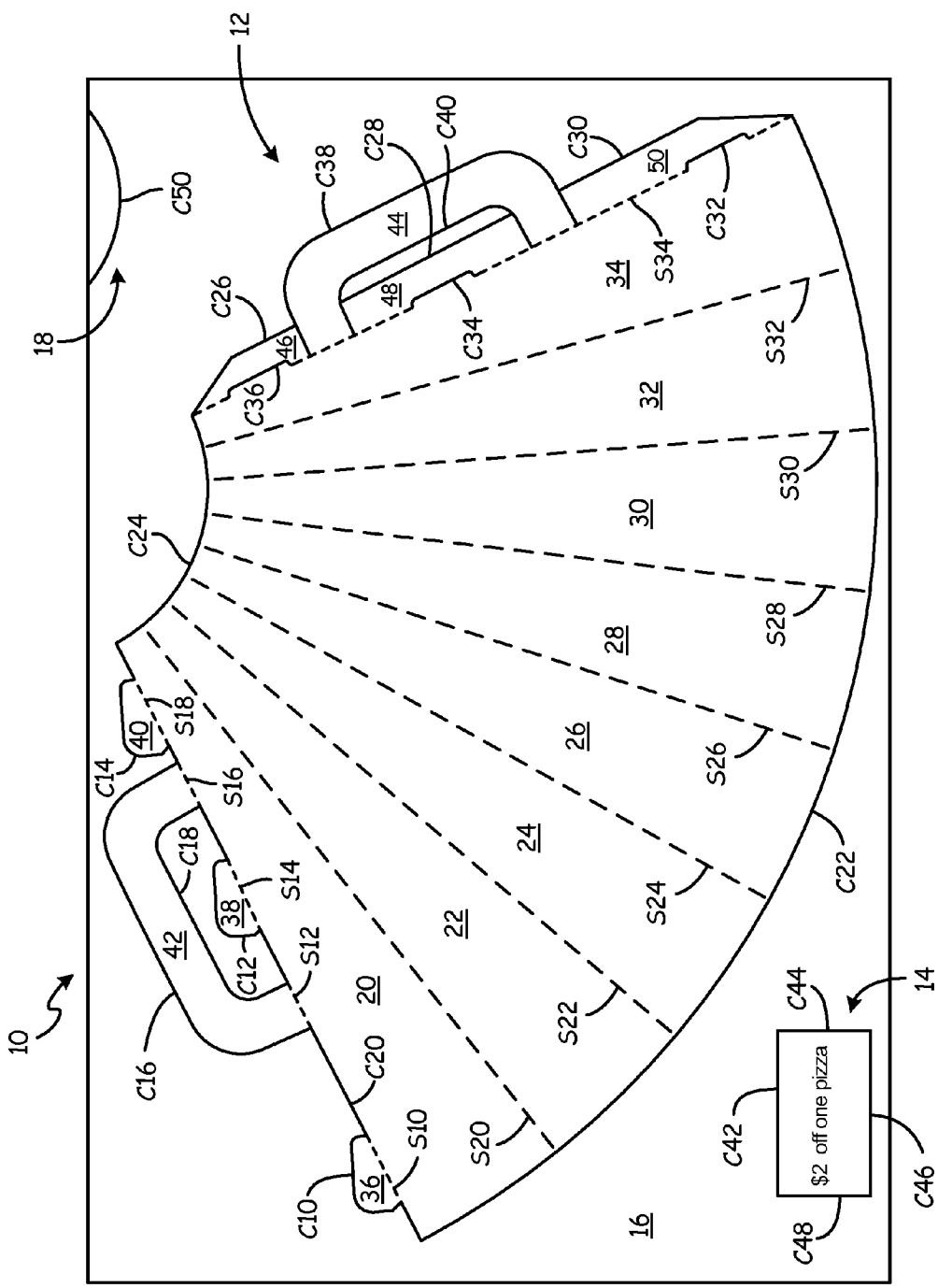
FIG. 1 is a top view of a printable blank sheet with a megaphone and a coupon.

FIG. 1 is a top view of printable blank sheet 10 with megaphone 12 and coupon 14 defined in printable blank sheet 10. Printable blank sheet 10 includes megaphone 12, coupon 14, excess sheet area 16, notch 18, cut lines C (C10, C12, C14, C16, C18, C20, C22, C24, C26, C28, C30, C32, C34, C36, C38, C40, C42, C44, C46, C48, and C50), and scored lines S (S10, S12, S14, S16, S18, S20, S22, S24, S26, S28, S30, S32, S34). Megaphone 12 includes panels 22, 24, 26, 28, 30, and 32, end panels 20 and 34, handles 42 and 44, and end tabs 36, 38, 40, 46, 48, and 50.

Printable blank sheet 10 is a flat sheet that is capable of being run through a printer. Printable blank sheet 10 includes a plurality of layers, including a printable substrate attached to a film layer with a dry lift adhesive (also known as a break-away adhesive). Megaphone 12 is positioned on printable blank sheet 10 and is capable of being removed from printable blank sheet 10 to be assembled. Coupon 14 is positioned on printable blank sheet 10 and is capable of being removed from printable blank sheet 10. Excess sheet area 16 surrounds megaphone 12 and coupon 14. After megaphone 12 and coupon 14 have been removed, excess sheet area 16 can be discarded. Cut lines C10-C40 define the periphery of megaphone 12 along which megaphone 12 can be removed from printable blank sheet 10. Cut lines C42-C48 define the periphery of coupon 14 along which coupon 14 can be removed from printable blank sheet 10. Cut lines C10-C48 extend through the printable substrate and dry lift adhesive layers of printable blank sheet 10 but not through the film layer. Scored lines S are areas where printable blank sheet 10 has been put under pressure to create a line of weakness in printable blank sheet 10 and are lines along which printable blank sheet 10 can be folded. Printable blank sheet 10 further comprises notch 18. Cut line C50 defines the periphery of notch 16 and extends through the printable substrate and dry lift adhesive layers of printable blank sheet 10 but not through the film layer. Notch 18 allows a user to separate the printable substrate from the film layer along the dry lift adhesive.

Figure 2:
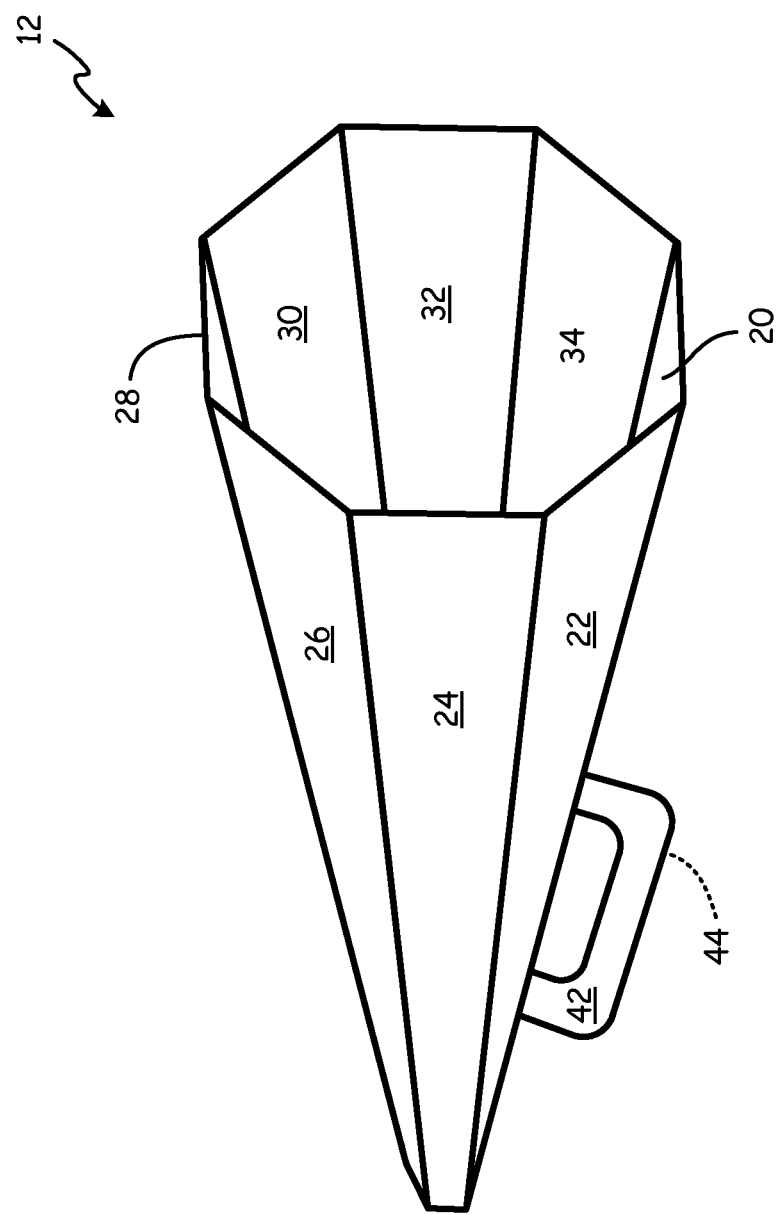
FIG. 2 is a perspective assembled view of the megaphone shown in FIG. 1.
Figure 3:
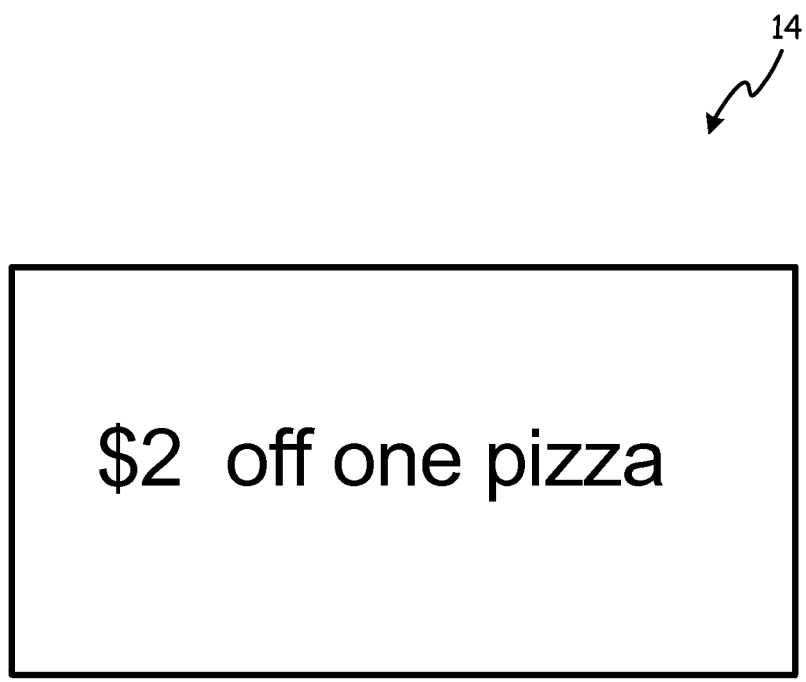
FIG. 3 is a top view of the coupon shown in FIG. 1.

FIG. 2 is a perspective view of megaphone 12. Megaphone 12 includes panels 22, 24, 26, 28, 30, and 32, end panels 20 and 34, and handles 42 and 44. End panel 20 is connected to handle 42 and panel 22. Panel 22 is connected to end panel 20 and panel 24. Panel 24 is connected to panel 22 and panel 26. Panel 26 is connected to panel 24 and panel 28. Panel 28 is connected to panel 26 and panel 30. Panel 30 is connected to panel 28 and panel 32. Panel 32 is connected to panel 30 and end panel 34. End panel 34 is connected to panel 32 and handle 44. FIG. 3 is a top view of coupon 14 after it has been removed from printable blank sheet 10.

As shown in FIG. 1, end panel 20 has sides C20, C22, C24, and S20. End panel 20 is connected to end tab 36 by scored line S10, end tab 38 by scored line S12, and end tab 40 by scored line S14. The outline of end tab 36 is defined by cut line C10, the outline of end tab 38 is defined by cut line C12, and the outline of end tab 40 is defined by cut line C14. End panel 20 is connected to handle 42 by scored lines S16 and S18. Handle 42 is defined by cut lines C16 and C18. End panel 20 is connected to side panel 22 by scored line S20.

Side panel 22 has sides C22, C24, S20, and S22. Side panel 22 is connected to side panel 24 along scored line S22. Side panel 24 has sides C22, C24, S22, S24. Side panel 24 is connected to side panel 26 along scored line S24. Side panel 26 has sides C22, C24, S24, S26. Side panel 26 is connected to side panel 28 along scored line S26. Side panel 28 has sides C22, C24, S26, S28. Side panel 28 is connected to side panel 30 along scored line S28. Side panel 30 has sides C22, C24, S28, S30. Side panel 30 is connected to side panel 32 along scored line S30. Side panel 32 has sides C22, C24, S30, and S32. Side panel 32 is connected to end panel 34 along scored line S32.

End panel 34 has sides C22, C24, S32, and S34. End panel 34 is connected to handle 44 and end tabs 46, 48, and 50 along scored line S34. The outline of handle 44 is defined by cut lines C38 and C40. The outlines of end tabs 46, 48 and 50 are defined by cut lines C26, C28, and C30, respectively.

Coupon 14 is defined by cut lines C42, C44, C46, and C48.

Printable blank sheet 10 can be run through a printer or copier to have an image printed on it. After printing, megaphone 12 and coupon 14 can be removed from printable blank sheet 10. Megaphone 12 and coupon 14 will then be free-standing. The outline of megaphone 12 and coupon 14 are defined by cut lines C. In the embodiment shown in FIG. 1, megaphone 12 is a flat with tabs extending outward from a main body portion with scored lines S and die cut lines C on the main body portion of the flat, giving megaphone 12 an intricate shape. Coupon 14 is a flat defined by die cut lines C.

Megaphone 12 can be folded along scored lines S to form a three-dimensional megaphone. Scored lines S20, S22, S24, S26, S28, S30, S32 and S34 can be folded into approximately 135 degree angles so that the end panels 20 and 34 and side panels 22, 24, 26, 28, 30 and 32 are at approximately 135 degree angles to the panels they are attached to. End tabs 36, 38, and 40 can be folded along scored lines S10, S12, and S14, respectively. End tab 36 can be inserted into cut line C32, end tab 38 can be inserted into cut line C34, and end tab 40 can be inserted into cut line C36. This holds megaphone 12 in its three-dimensional shape. In an alternate embodiment, end tabs 36, 38, and 40 can include an adhesive, such as tape, that is used to connect them to megaphone 12. The adhesive can be applied during the manufacturing of printable blank sheet 10 or by a user when a user is assembling megaphone 12.

Simultaneously forming megaphone 12 and coupon 14 from printable blank sheet 10 is advantageous, as it creates new opportunities for combining marketing and custom print materials. The production of a customized object and a coupon give businesses increased opportunities to promote themselves to potential customers and clients. In one example, a business could create a custom three-dimensional object containing its indicia as well as a coupon associated with its goods or services. With the present technology, the business could produce both of these internally at a lower cost than sending the job to a custom print shop. In another example, two businesses could collaborate to produce a three-dimensional object bearing the indicia of one business and a coupon for the goods or services of the other business. This provides an easy avenue for a strategic relationship and cost-sharing to occur between businesses while each has an opportunity to promote itself.

Figure 4:
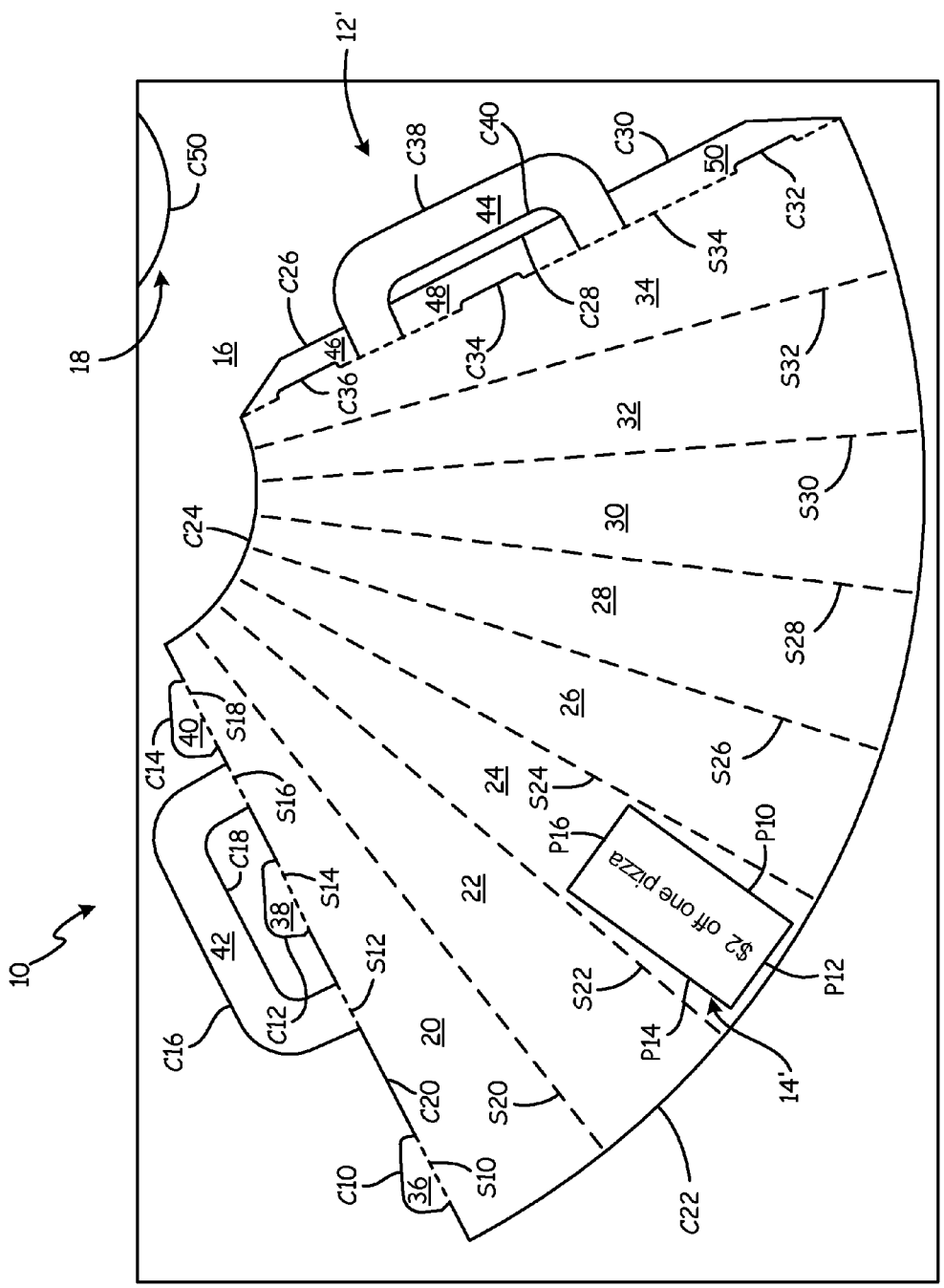
FIG. 4 is a top view of a printable blank sheet with two objects superimposed on each other in the sheet.

FIG. 4 is a top view of printable blank sheet 10 with megaphone 12' and coupon 14' defined in printable blank sheet 10. Printable blank sheet 10 includes megaphone 12', coupon 14', excess sheet area 16, notch 18, cut lines C (C10, C12, C14, C16, C18, C20, C22, C24, C26, C28, C30, C32, C34, C36, C38, C40, and C50), perforated lines P (P10, P12, P14, and P16), and scored lines S (S10, S12, S14, S16, S18, S20, S22, S24, S26, S28, S30, S32, S34). Megaphone 12' includes panels 22, 24, 26, 28, 30, and 32, end panels 20 and 34, handles 42 and 44, and end tabs 36, 38, 40, 46, 48 and 50.

Printable blank sheet 10 is a flat sheet that is capable of being run through a printer. Printable blank sheet 10 includes a plurality of layers, including a printable substrate attached to a film layer with a dry lift adhesive. Megaphone 12' is positioned on printable blank sheet 10 and is capable of being removed from printable blank sheet 10 to be assembled. Coupon 14' is positioned on panel 24 of megaphone 12'. Excess sheet area 16 surrounds megaphone 12'. After megaphone 12' has been removed, excess sheet area 16 can be discarded. Cut lines C10-C40 define the periphery of megaphone 12' along which megaphone 12' can be removed from printable blank sheet 10. Perforated lines P10-P16 define the periphery of coupon 14' along which coupon 14' can be removed from megaphone 12'. Cut lines C10-C40 extend through the printable substrate and dry lift adhesive layers of printable blank sheet 10 but not through the film layer. Scored lines S are areas where printable blank sheet 10 has been put under pressure to create a line of weakness in printable blank sheet 10 along which printable blank sheet 10 can be folded. Perforated lines P are areas where printable blank sheet 10 has been pierced to create a line of weakness in printable blank sheet 10 along which printable blank sheet 10 can be separated. Printable blank sheet 10 further comprises notch 18. Cut line C50 defines the periphery of notch 16 and extends through the printable substrate and dry lift adhesive layer of printable blank sheet 10 but not through the film layer. Notch 18 allows a user to separate the printable substrate from the film layer along the dry lift adhesive.

FIG. 5 is a perspective view of megaphone 12'. Megaphone 12' includes panels 22, 24, 26, 28, 30, and 32, end panels 20 and 34, coupon 14' and handles 42 and 44. End panel 20 is connected to handle 42 and panel 22. Panel 22 is connected to end panel 20 and panel 24. Panel 24 is connected to panels 22 and 26. Panel 26 is connected to panels 24 and 28. Panel 28 is connected to panels 26 and 30. Panel 30 is connected to panels 28 and 32. Panel 32 is connected to panel 30 and end panel 34. End panel 34 is connected to panel 32 and handle 44. Coupon 14' is located on panel 24.

In alternate embodiments, perforated lines P surrounding coupon 14', as shown in FIG. 4, could be removed. In that embodiment, a user could cut coupon 14' out of megaphone 12' after he or she was done using megaphone 12'.

Superimposing a coupon onto a three-dimensional object is advantageous, as it allows for a single physical object to contain both as the three-dimensional object and the coupon to serve as a marketing tool. It provides the same benefits as discussed above for the separated object and coupon, but also allows users to receive a single object which they can then discard at the end of its use while retaining the coupon. It allows the business to supply a single object to users rather than distributing a coupon separately from the object. This simplifies distribution for the business and will reduce loss of the coupon by users.

Coupon 14 as seen in FIGS. 1-3 and coupon 14' as seen in FIGS. 4-5 can be attached to printable blank sheet 10 in any suitable manner in alternate embodiments. For example, coupon 14 and coupon 14' could be a label that is applied to printable blank sheet 10 and peeled off of printable blank sheet 10. This would not require coupon 14 and coupon 14' to be cut into printable blank sheet 10 with either cut lines C or perforated lines P.

Figure 6A:
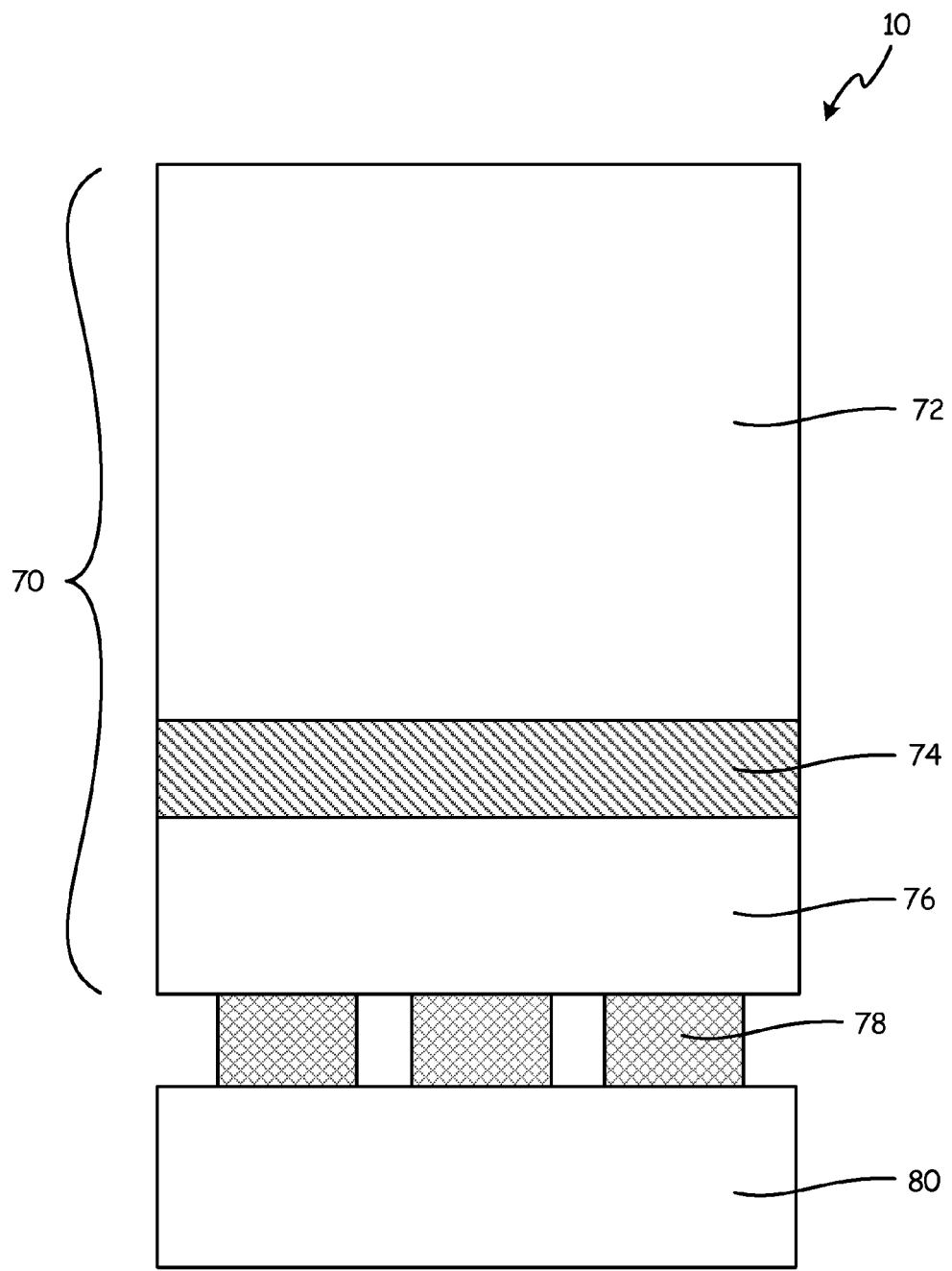
FIG. 6A is a side cross-sectional view of the printable blank sheet showing the layers of material in the printable blank sheet.
Figure 6B:
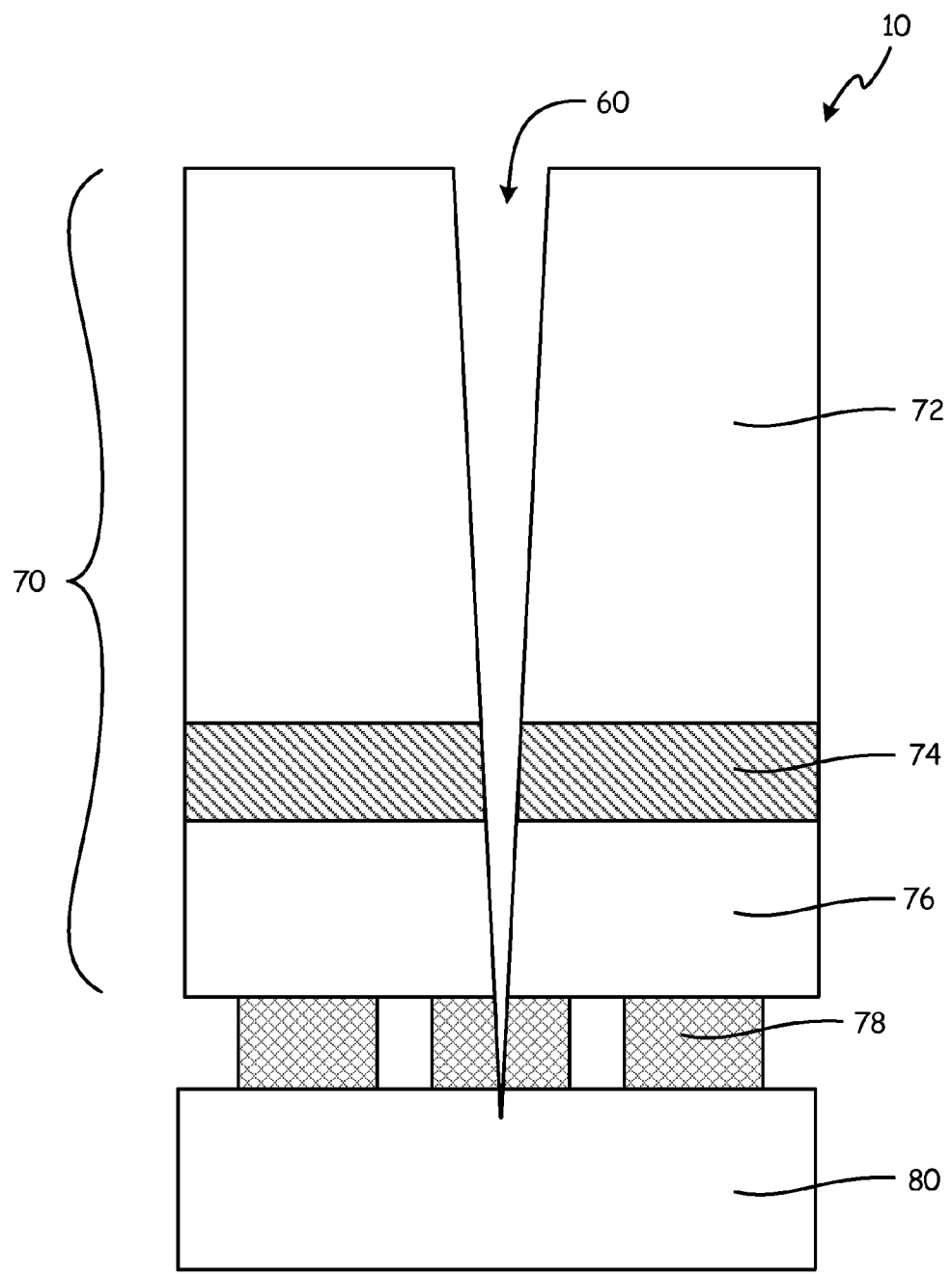
FIG. 6B is a side cross-sectional view of the printable blank sheet after it has been cut.

FIG. 6A is a side cross-sectional view (not to scale) of printable blank sheet 10 showing the layers of material in printable blank sheet 10. FIG. 6B is a side cross-sectional view of printable blank sheet 10 after it has been cut. Printable blank sheet 10 includes printable substrate 70, dry lift adhesive 78, film layer 80, and cut line 60. Printable substrate 70 includes sheet layer 72, pressure sensitive adhesive 74, and film layer 76.

Printable blank sheet 10 is made out of printable substrate 70, dry lift adhesive 78 and film layer 80. Printable substrate 70 includes sheet layer 72, pressure sensitive adhesive 74, and film layer 76. A bottom face of sheet layer 72 is connected to a top face of film layer 76 with pressure sensitive adhesive 74. A bottom face of film layer 76 (the bottom face of printable substrate 70) is connected to a top face of film layer 80 with dry lift adhesive 78. In alternate embodiments, printable substrate 70 can include different or more layers, as long as printable blank sheet 10 is capable of being passed through a printer.

Sheet layer 72 forms the top layer of printable blank sheet 10. Sheet layer 72 is a paper layer in the embodiment shown, but can also be a synthetic material in alternate embodiments, such as polyester (PET), polypropylene, vinyl, or other printable synthetic materials. Sheet layer 72 can have a thickness from 2.5 mils (0.0025 inches) to 60 mils (0.06 inches).

Film layer 76 forms the middle layer of printable blank sheet 10. Film layer 76 is biaxially oriented polypropolyene (BOPP) in the embodiment shown, but can be any suitable film in alternate embodiments, including polyethelyene (PE), polyester (PET), and polyvinyl chloride (PVC). Film layer 76 can have a thickness from 1 mil (0.001 inches) to 1½ mils (0.0015 inches).

Pressure sensitive adhesive 74 is used to connect a bottom face of sheet layer 72 to a top face of film layer 76. Pressure sensitive adhesive 74 is a pressure activated adhesive that will form a bond between sheet layer 72 and film layer 76 when they are pressed together. Pressure sensitive adhesive 74 can have a thickness of about ½ mil (0.0005 inches). In an alternate embodiment, pressure sensitive adhesive 74 can be a heat activated adhesive or any other suitable adhesive.

Sheet layer 72, pressure sensitive adhesive 74, and film layer 76 form printable substrate 70. Printable substrate 70 can have a thickness between 4 mils (0.004 inches) and 62 mils (0.062 inches). Printable substrate 70 preferably has a thickness between 4 mils (0.004 inches and 18 mils (0.018 inches).

Film layer 80 forms the bottom layer of printable blank sheet 10. Film layer 80 is biaxially oriented polypropolyene (BOPP) in the embodiment shown, but can be any suitable film in alternate embodiments, including polyethelyene (PE), polyester (PET), and polyvinyl chloride (PVC). Film layer 80 can have a thickness between ½ mil (0.0005 inches) and 4 mil (0.004 inches). Film layer 80 has a matte finish on a bottom face. Having a matte finish on the bottom face of film layer 80 prevents the bottom face of film layer 80 from sticking to the item it is positioned on. This helps printable blank sheets 10 feed into a printer, as printable blank sheets 10 can be inserted into a printer tray as a stack and one printable blank sheet 10 can easily be lifted off of the stack of printable blank sheets 10 to run through the printer.

Dry lift adhesive 78 is used to connect a bottom face of film layer 76 (the bottom face of printable substrate 70) to a top face of film layer 80. Dry lift adhesive 78 may also be called a break-away adhesive. Dry lift adhesive 78 can have a thickness of about ⅓ mil (0.00033 inches). Dry lift adhesive 78 is a strong adhesive that is applied as a pattern so that there are areas of dead space between areas of dry lift adhesive 78. The high strength of dry lift adhesive 78 will hold object 12 in printable blank sheet 10 as printable blank sheet 10 is being sent through a printer. The pattern of dry lift adhesive 78 allows a corner of object 12 to be pulled up and away from film layer 80 in an area that has a dead space. Object 12 can then be fully removed from printable blank sheet 10 by pulling it off of film layer 80 along dry lift adhesive 78. The pattern of dry lift adhesive 78 also allows film layer 80 to be lifted away from printable substrate 70 in an area that has a dead space. Film layer 80 can then be fully removed from printable blank sheet 10 by pulling it off of printable substrate 70 along dry lift adhesive 78. In alternate embodiments, dry lift adhesive 78 can be applied with varying thicknesses. Areas with a lower thickness will be weak areas where object 12 can be separated from film layer 80.

Printable blank sheet 10 can be cut with cut line 60, as seen in FIG. 6B. Cut line 60 extends through printable substrate 70 and dry lift adhesive 78. Cut line 60 may extend a short distance into film layer 80, but will not cut through film layer 80. Cut line 60 is formed by die cutting through printable substrate 70 and dry lift adhesive 78. This form of cutting through a top layer but not through a bottom layer is known as "kiss cutting." Cut line 60 allows a periphery of an object to be cut out of printable substrate 70 while still maintaining film layer 80 as a solid layer.

Cutting through a top layer (or layers) of printable blank sheet 10 but not through a bottom layer allows the top layer to be held on printable blank sheet 10 as printable blank sheet 10 is passed through a printer. After printable blank sheet 10 has been passed through a printer, the objects that have been cut into the top layer of printable blank sheet 10 can be pulled out of printable blank sheet 10 by separating the top layer from the bottom layer along dry lift adhesive 78. Dry lift adhesive 78 has a dry release so neither the object nor the bottom layer will have a sticky residue left on them after the object is removed from the bottom layer. In the embodiment seen in FIGS. 6A-6B, printable substrate 70 can be pulled off of film layer 80 along dry lift adhesive 78. A majority of dry lift adhesive 78 will remain on film layer 80, but neither printable substrate 70 nor film layer 80 will have a sticky residue on them. This is advantageous, as the object that is cut out of printable substrate 70 can then be used as a marketing material. Further, when multiple parts are included on a single sheet, one part can be removed and the remaining parts can be stored in the sheet.

Using dry lift adhesive 78 in printable blank sheet 10 is advantageous, as intricately shaped objects can be cut into printable substrate 70 and then easily removed from printable substrate 70 after printable blank sheet 10 has been run through a printer. Dry lift adhesives have been previously used with printable blank sheets when simple two-dimensional objects are being formed. A solid layer (known in the art as a flood coat) of the dry lift adhesive can be applied between two layers. In order for the simple two-dimensional structures to be removed, the dry lift adhesive had to have a weak strength so that the objects could be removed. The weak strength of the dry lift adhesive in previous printable blank sheets limited what objects could be cut into the sheet, as the dry lift adhesive was not strong enough to hold complex and intricate designs in the sheet when the sheet was being run through a printer. Thus, sheets were limited to simple two-dimensional objects with few cut lines, such as rectangular business cards.

Applying dry lift adhesive 78 as a pattern allows dry lift adhesive 78 to have a higher strength than previously used dry lift adhesives. The higher strength dry lift adhesive 78 is capable of holding intricately shaped objects with multiple cut lines in printable blank sheet 10 as printable blank sheet 10 is run through a printer. The objects can then be removed from printable blank sheet 10 by separating printable substrate 70 from film layer 80 where there is a dead space in dry lift adhesive 78. Applying dry lift adhesive 78 as a pattern allows intricate three-dimensional shapes to be cut into printable substrate 70 in the embodiment shown in FIG. 1. Objects with intricate shapes are objects that include at least one of the following features: shapes with curved edges; shapes with corners at non-square angles; shapes with edges running neither parallel nor perpendicular to each other; objects with flanges extending outward from a main body portion; objects that are shaped as irregular polygons; objects where at least a portion of the periphery of the object is curved; and objects with scored lines, perforated lines, or die cut lines on a body portion of the object. These complex and intricate shapes will remain attached to film layer 80 during printing due to the higher strength of the dry lift adhesive 78.

Figure 7A:
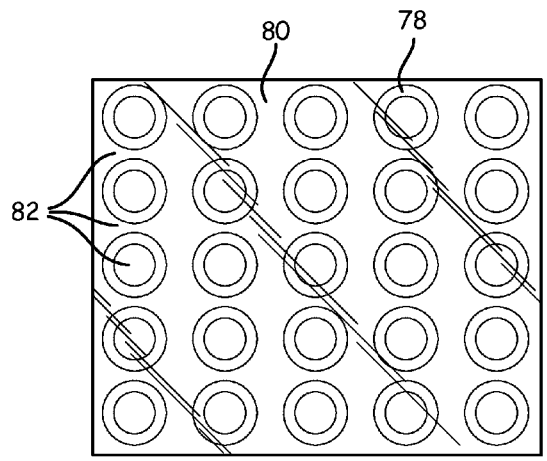
FIG. 7A is a front view of a first embodiment of a patterned laminating adhesive.
Figure 7B:
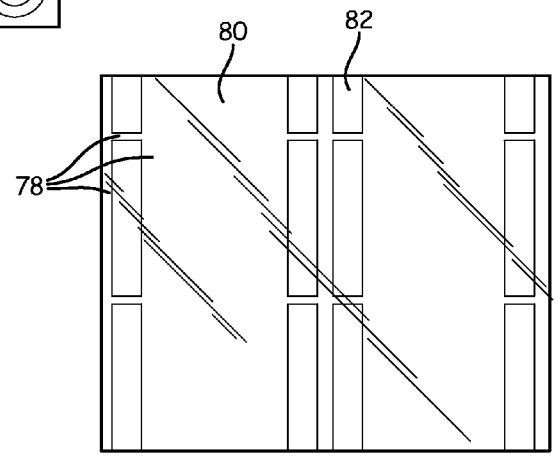
FIG. 7B is a front view of a second embodiment of a patterned laminating adhesive.
Figure 7C:
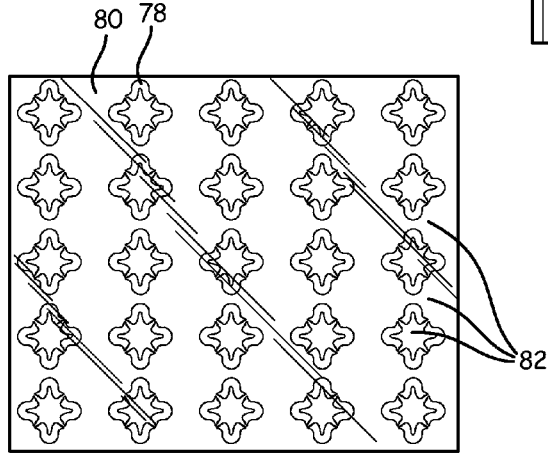
FIG. 7C is a front view of a third embodiment of a patterned laminating adhesive.

FIGS. 7A-7C show examples of a dry lift adhesive being applied as different patterned laminating adhesives 78. FIG. 7A is a front view of a first embodiment of patterned laminating adhesive 78. FIG. 7B is a front view of a second embodiment of patterned laminating adhesive 78. FIG. 7C is a front view of a third embodiment of patterned laminating adhesive 78. FIGS. 7A-7C include patterned laminating adhesive 78, film layer 80, and dead space 82. Patterned laminating adhesive 78 is a dry lift adhesive that is applied as a pattern to facilitate the easy removal of a top layer from film layer 80. Dead spaces 82 are the open spaces where patterned laminating adhesive 78 has not been applied.

As seen in FIG. 7A, patterned laminating adhesive 78 can be applied as a plurality of rings that are spaced apart. As seen in FIG. 7B, patterned laminating adhesive 78 can be applied with voided strips that are capable of being aligned with edges of the complex part. As seen in FIG. 7C, patterned laminating adhesive 78 can be applied as a plurality of V-shaped areas that are arranged in groups of fours and spaced apart.

Dead spaces 82 are positioned between and around patterned laminating adhesive 78. Dead spaces 82 are areas where patterned laminating adhesive 78 has not been applied. When a patterned laminating adhesive is used to connect two different layers of materials, dead spaces 82 provide areas where the layers can be pulled apart. This allows a user to begin to separate the layers along patterned laminating adhesive 78. Dead spaces 82 allow higher strength patterned laminating adhesives 78 to be used, as dead spaces 82 provide gaps in patterned laminating adhesive 78 so that different layers can be separated.

FIGS. 8-16 show multiple alternative embodiments.

Figure 8:
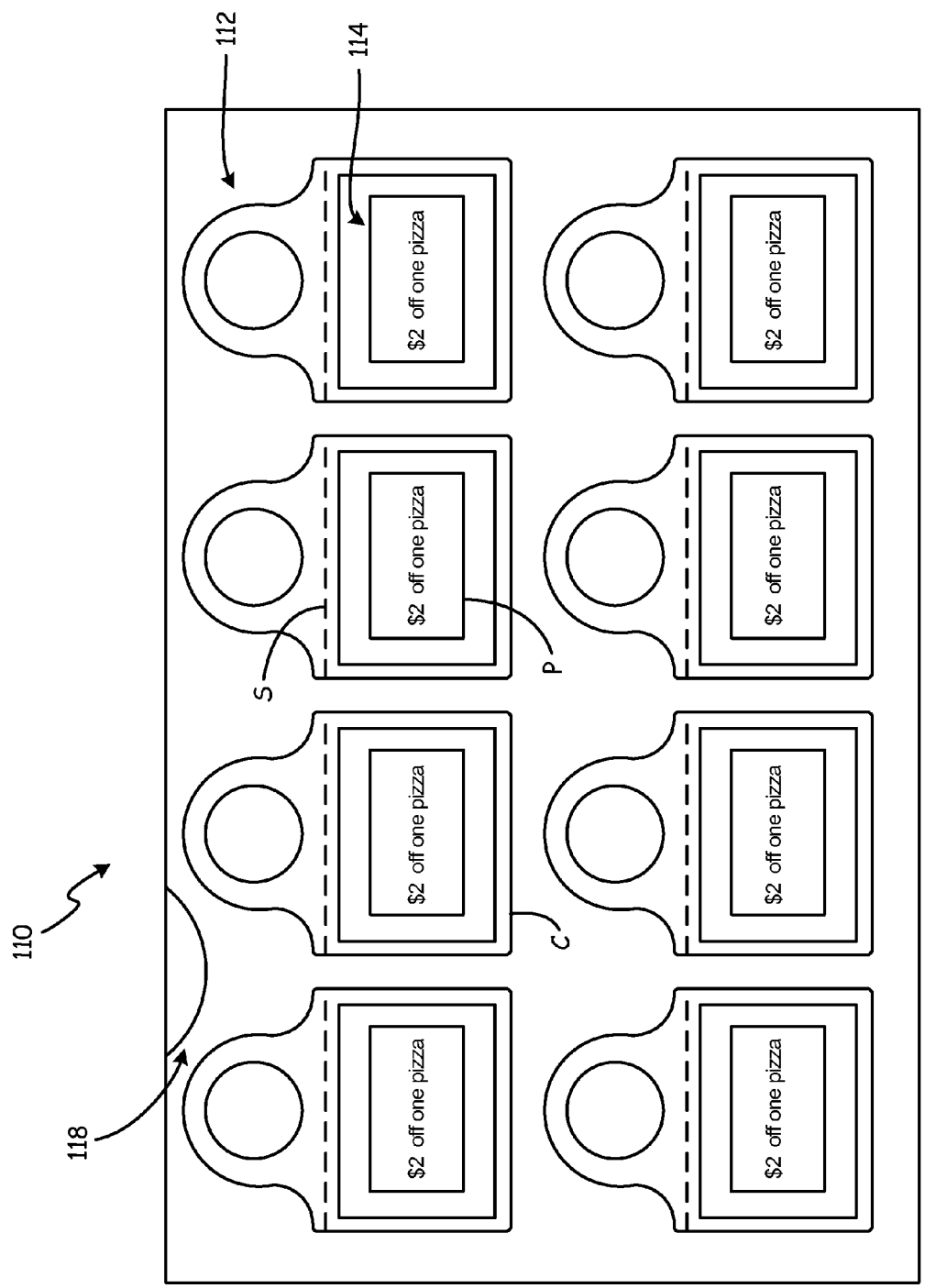
FIG. 8 is a top view of a printable blank sheet with bottle hangers and a coupon.

FIG. 8 is printable blank sheet 110 with bottle hangers 112, coupons 114, and notch 118. In this embodiment, coupons 114 are superimposed on bottle hangers 112. In the embodiment shown in FIG. 8, bottle hangers 112 are flats with tabs extending outward from a main body portion. Scored lines S, die cut lines C, and perforated lines P are on the main body portion of the flat, giving bottle hangers 112 an intricate shape. Coupon 114 is a flat defined by perforated lines P.

Figure 9:
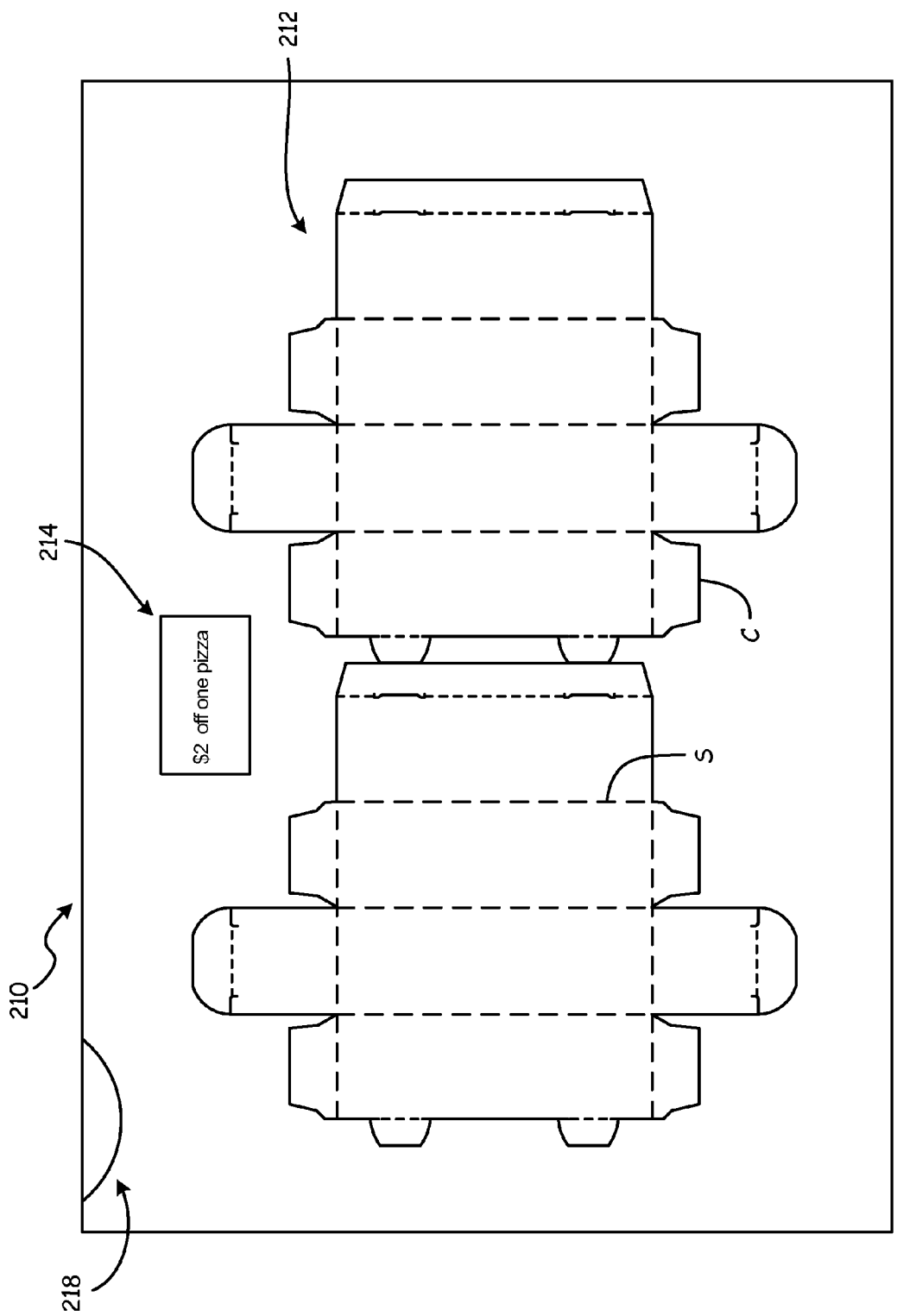
FIG. 9 is a top view of a printable blank sheet with a tall box and a coupon.

FIG. 9 is printable blank sheet 210 with boxes 212, coupon 214, and notch 218. In this embodiment, coupon 214 is located on printable blank sheet 210. In the embodiment shown in FIG. 9, boxes 212 are flats with tabs extending outward from a main body portion and scored lines S and die cut lines C on the main body portion of the flat, giving boxes 212 an intricate shape. Coupon 214 is a flat defined by cut lines C.

Figure 10:
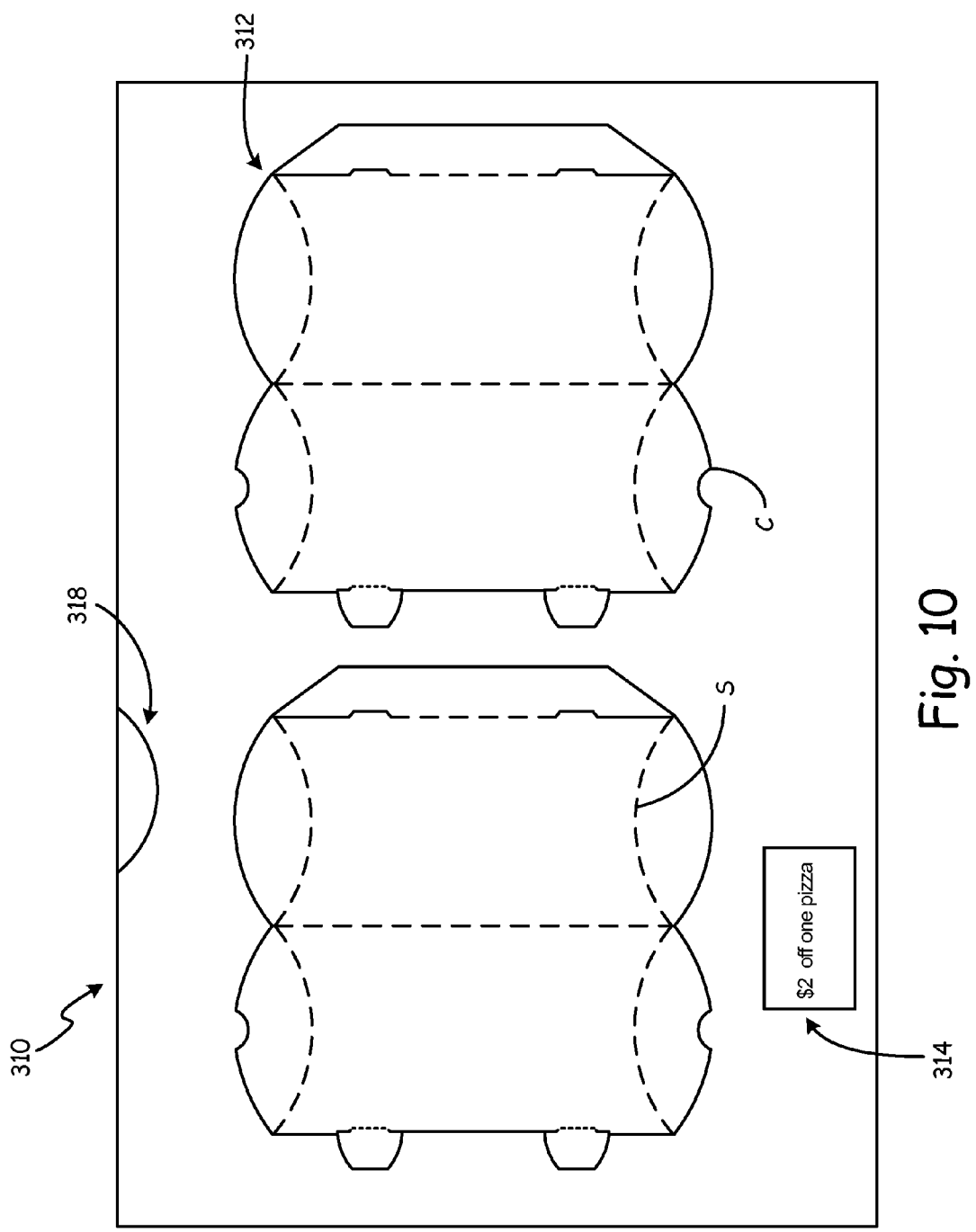
FIG. 10 is a top view of a printable blank sheet with pillow boxes and a coupon.

FIG. 10 is printable blank sheet 310 with pillow boxes 312, coupon 314, and notch 318. In this embodiment, coupon 314 is located on printable blank sheet 310. In the embodiment shown in FIG. 10, pillow boxes 312 are flats with tabs extending outward from a main body portion and scored lines S and die cut lines C on the main body portion of the flat, giving pillow boxes 312 an intricate shape. Coupon 314 is a flat defined by cut lines C.

Figure 11:
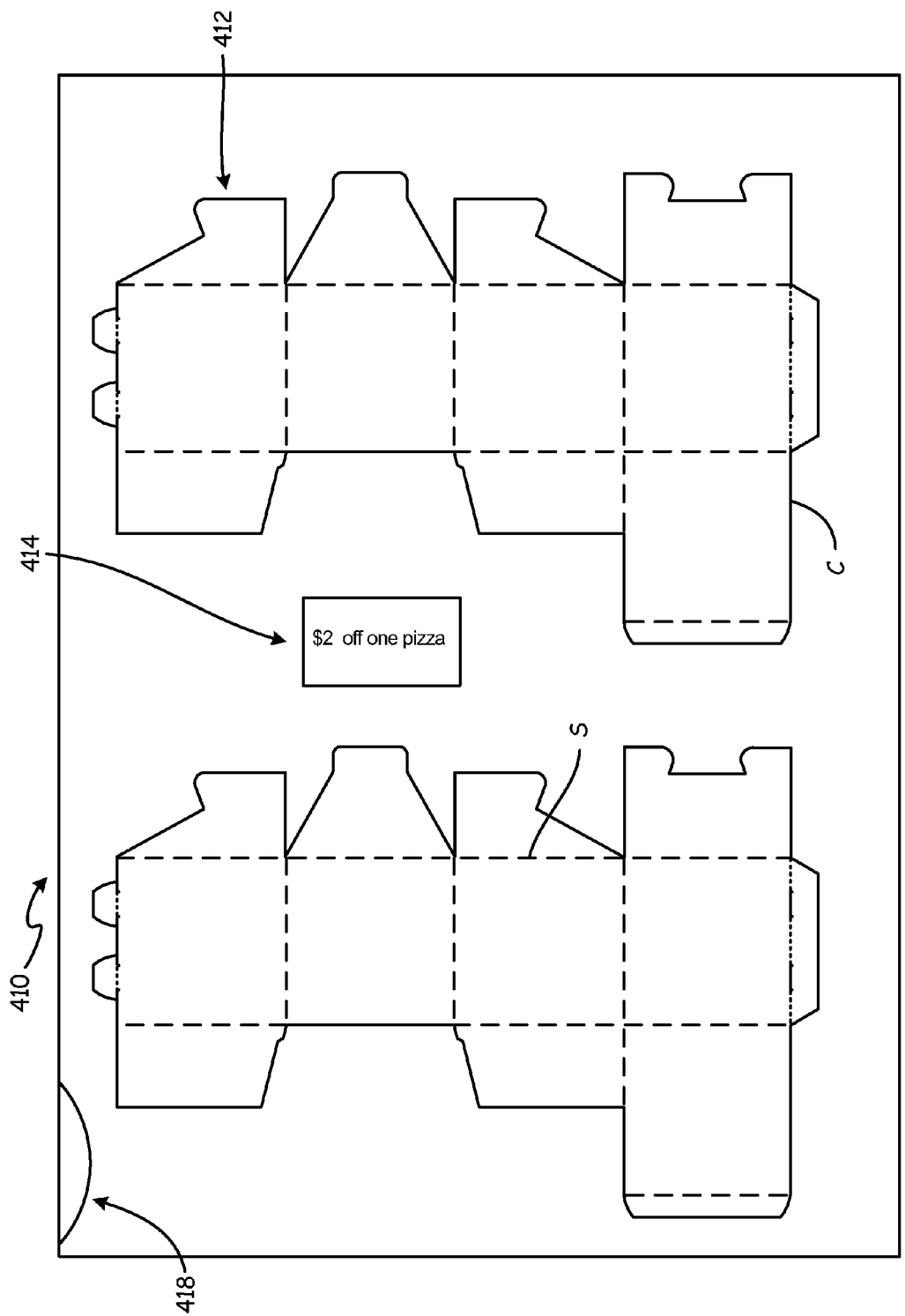
FIG. 11 is a top view of a printable blank sheet with small boxes and a coupon.

FIG. 11 is printable blank sheet 410 with small boxes 412, coupon 414, and notch 418. In this embodiment, coupon 414 is located on printable blank sheet 410. In the embodiment shown in FIG. 11, small boxes 412 are flats with tabs extending outward from a main body portion and scored lines S and die cut lines C on the main body portion of the flat, giving small boxes 412 an intricate shape. Coupon 414 is a flat defined by cut lines C.

Figure 12:
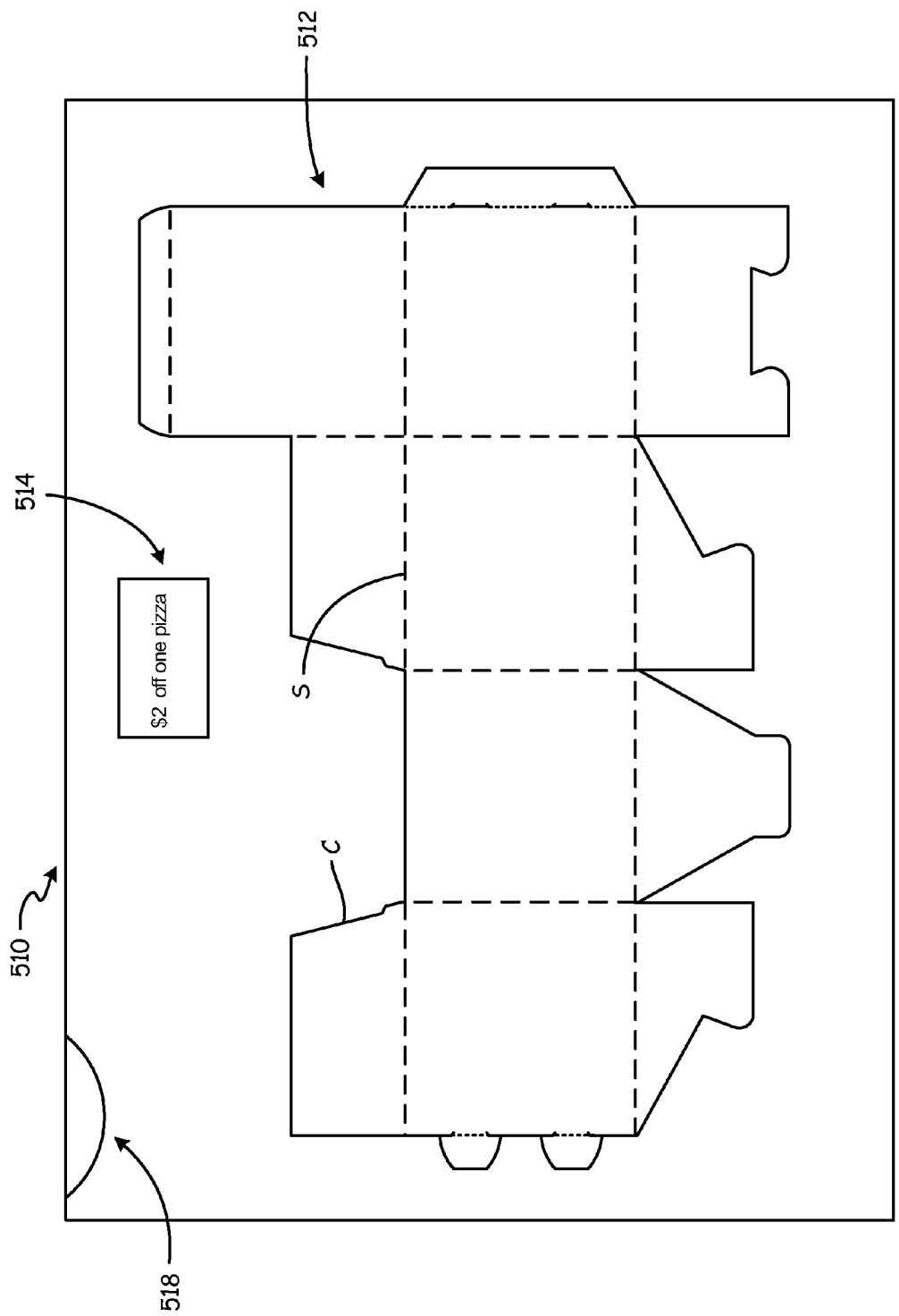
FIG. 12 is a top view of a printable blank sheet with large boxes and a coupon.

FIG. 12 printable blank sheet 510 with large box 512, coupon 514, and notch 518. In this embodiment, coupon 514 is located on printable blank sheet 510. In the embodiment shown in FIG. 12, large box 512 is a flat with tabs extending outward from a main body portion and scored lines S and die cut lines C on the main body portion of the flat, giving large box 512 an intricate shape. Coupon 514 is a flat defined by cut lines C.

Figure 13:
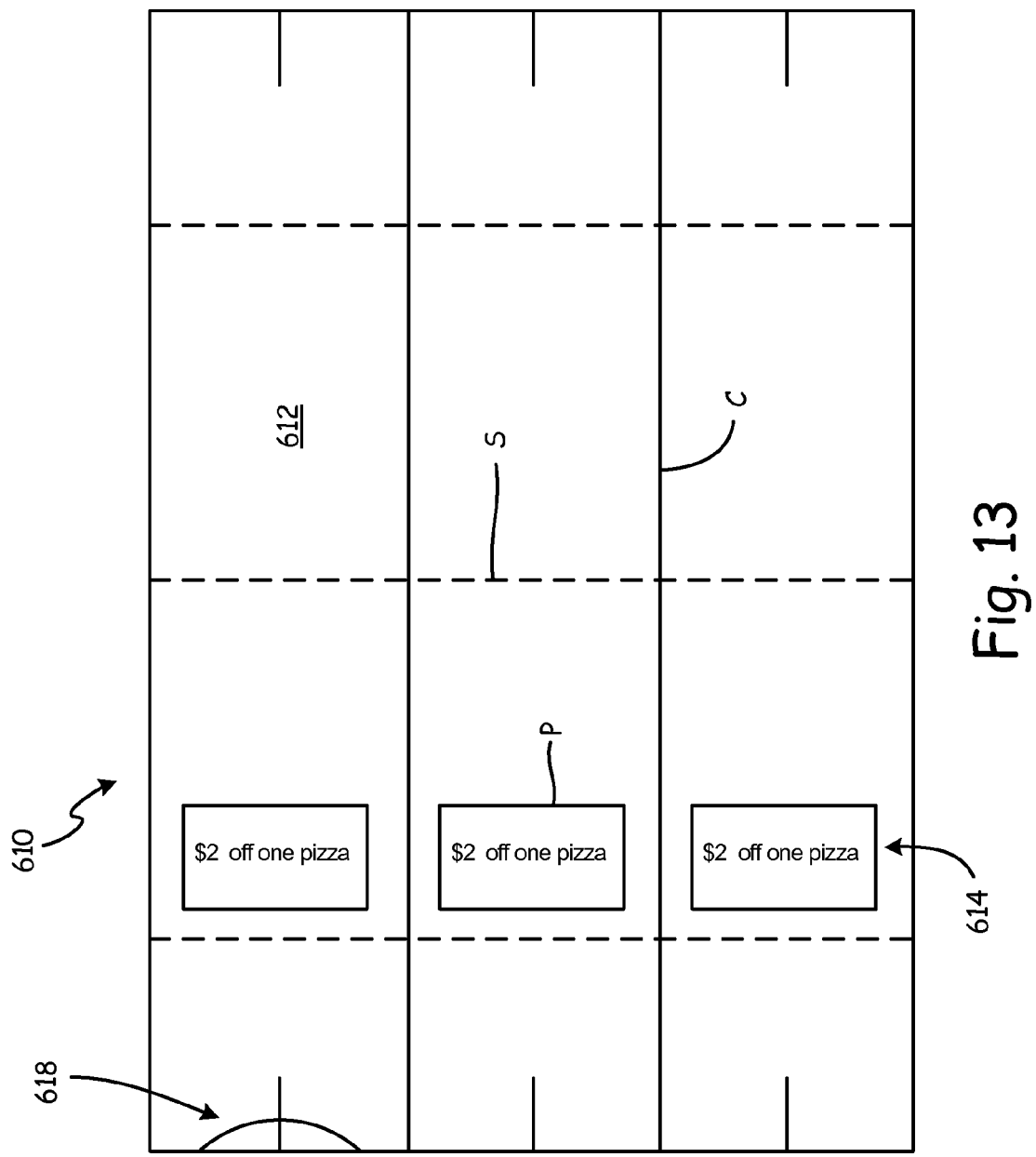
FIG. 13 is a top view of a printable blank sheet with table tents and a coupon.

FIG. 13 printable blank sheet 610 with table tents 612, coupons 614, and notch 618. In this embodiment, coupons 614 are superimposed on table tents 612. In the embodiment shown in FIG. 13, table tents 612 are flats with tabs extending outward from a main body portion. Scored lines S, die cut lines C, and perforated lines P are on the main body portion of the flat, giving table tents 612 an intricate shape. Coupons 614 are flats defined by perforated lines P.

Figure 14:
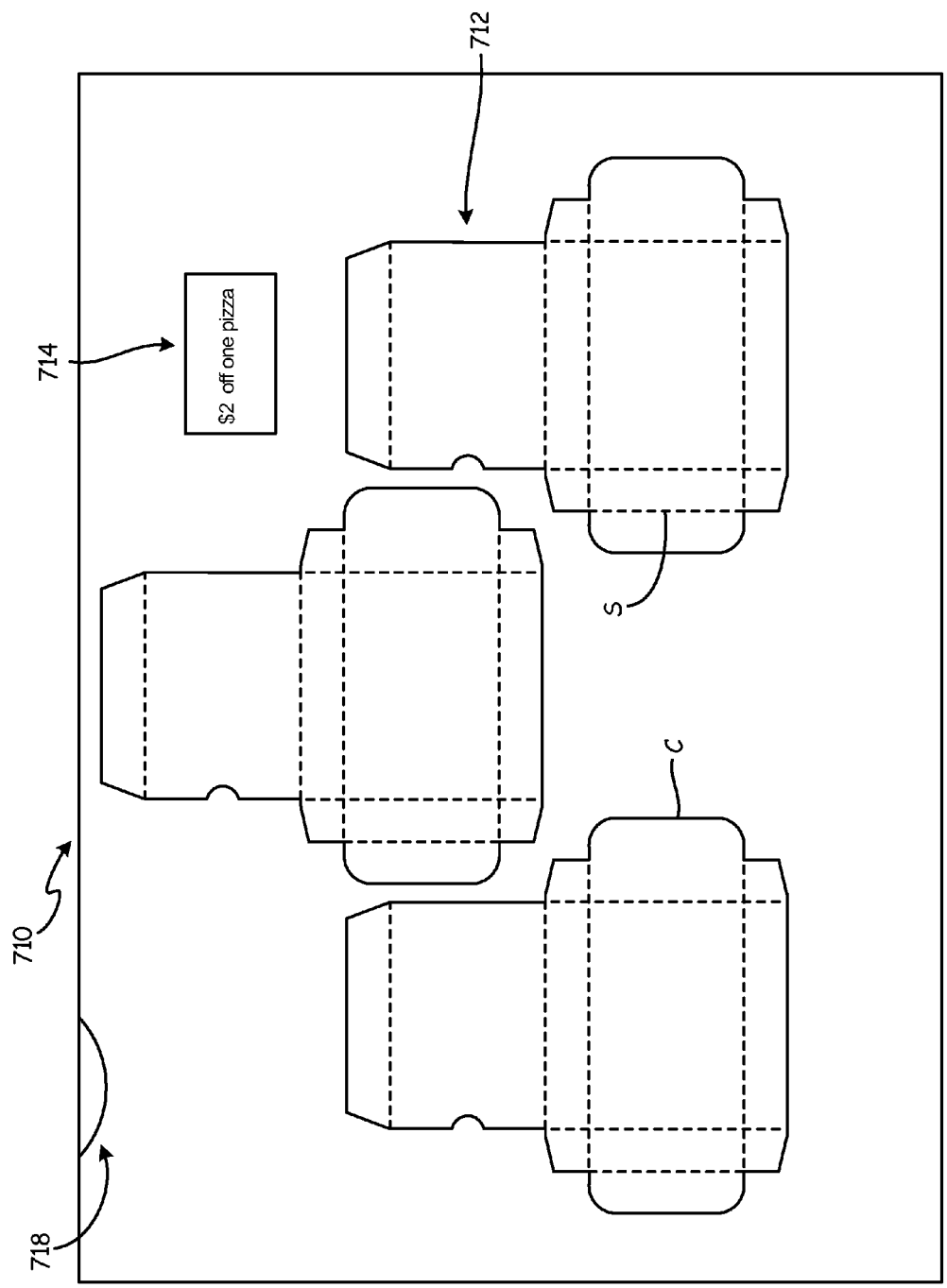
FIG. 14 is a top view of a printable blank sheet with playing card boxes and a coupon.

FIG. 14 printable blank sheet 710 with playing card boxes 712, coupon 714, and notch 718. In this embodiment, coupon 714 is located on printable blank sheet 710. In the embodiment shown in FIG. 14, playing card boxes 712 are flats with tabs extending outward from a main body portion and scored lines S and die cut lines C on the main body portion of the flat, giving playing card boxes 712 an intricate shape. Coupon 714 is a flat defined by cut lines C.

Figure 15:
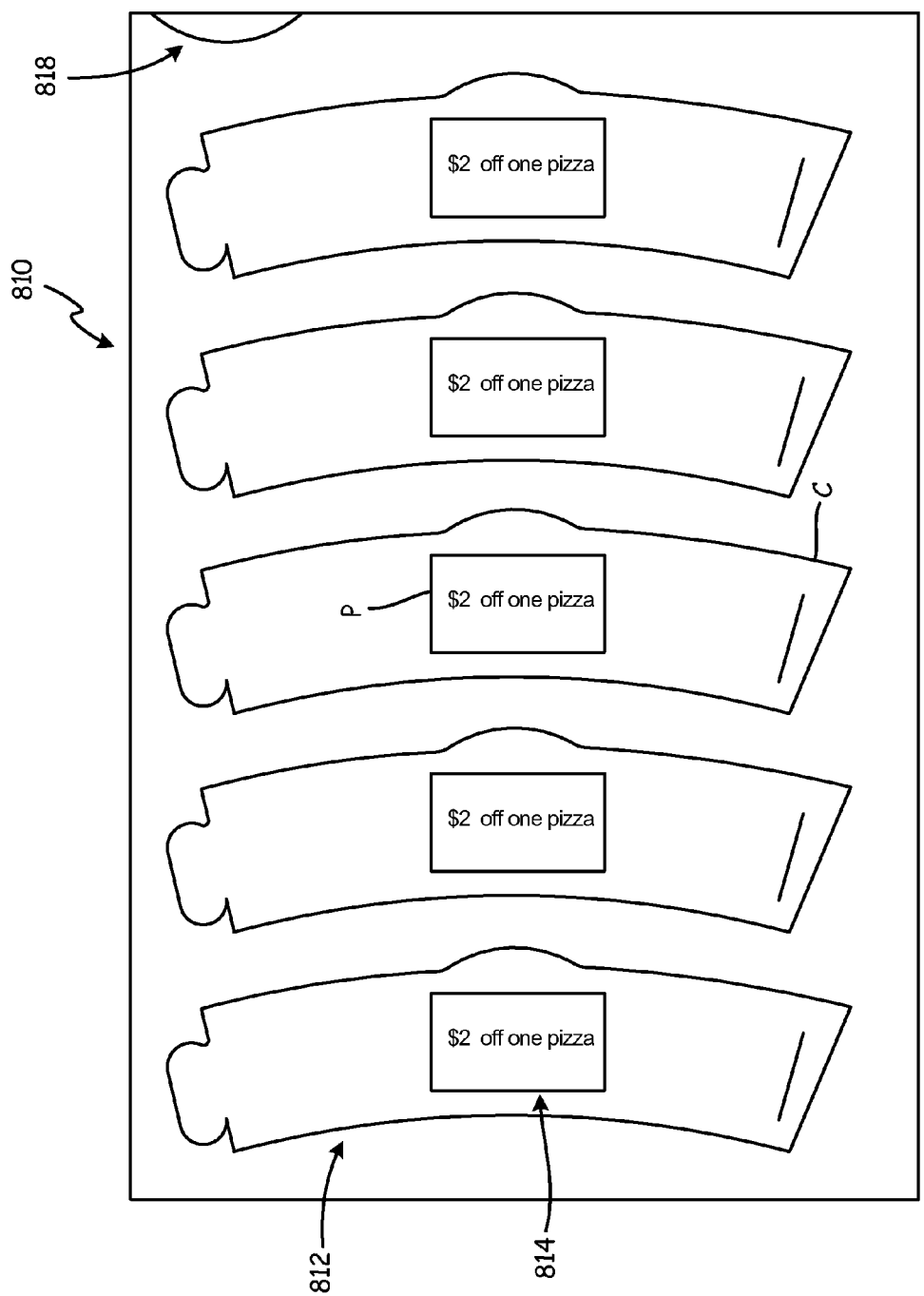
FIG. 15 is a top view of a printable blank sheet with cup sleeves and a coupon.

FIG. 15 printable blank sheet 810 with cup sleeves 812, coupons 814, and notch 818. In this embodiment, coupons 814 are superimposed on cup sleeves 812. In the embodiment shown in FIG. 15, cup sleeves 812 are flats with tabs extending outward from a main body portion. Die cut lines C and perforated lines P are on the main body portion of the flat, giving cup sleeves 812 an intricate shape. Coupons 814 are flats defined by perforated lines P.

Figure 16:
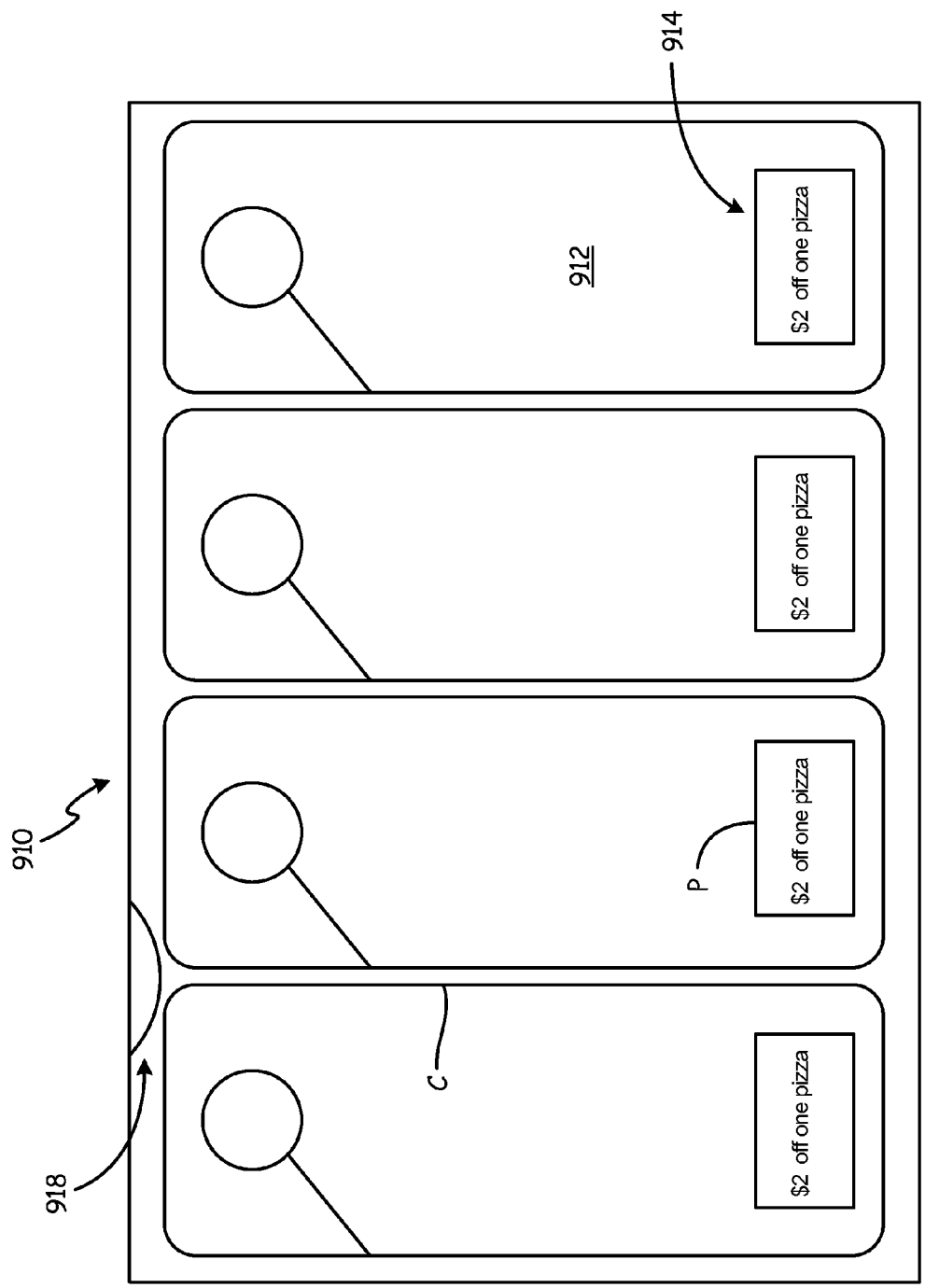
FIG. 16 is a top view of a printable blank sheet with door hangers and a coupon.

FIG. 16 printable blank sheet 910 with door hangers 912, coupons 914, and notch 918. In this embodiment, coupons 914 are superimposed on door hangers 912. In the embodiment shown in FIG. 16, door hangers 912 are flats with tabs extending outward from a main body portion. Die cut lines C and perforated lines P are on the main body portion of the flat, giving door hangers 912 an intricate shape. Coupons 914 are flats defined by perforated lines P.

In all of the embodiments depicted in FIGS. 8-16, objects are separated from the printable blank sheet along cut lines C. Scored lines S are used to fold the flat object into its three dimensional shape. In FIGS. 9-12 and 14, coupons are also removed along cut lines C. In FIGS. 8, 13, and 15-16, coupons are capable of being removed from the object along perforated lines P.

In alternate embodiments, the use of perforated lines P above could be replaced by having a user cut the coupon out of the object at the end of its use.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A printable blank sheet comprising:
   a sheet with a top substrate and a bottom layer that is configured to be run through a printer;
   a dry lift adhesive connecting the top substrate to the bottom layer, wherein the dry lift adhesive extends across an entirety of the sheet;
   an object with an intricate shape cut into the top substrate but not the bottom layer;
   an excess sheet area surrounding the object in the sheet; and
   a coupon cut into the top substrate but not the bottom layer, wherein the coupon is superimposed on and integrally formed with the object.

2. The printable blank sheet of claim 1, wherein the top substrate can be separated from the bottom layer along the dry lift adhesive.

3. The printable blank sheet of claim 1, and further comprising:
   a notch in the sheet at an edge of the sheet.

4. The printable blank sheet of claim 1, wherein the bottom layer of the sheet is a film layer.

5. The printable blank sheet of claim 1, wherein the top substrate further comprises:
   a sheet layer that is capable of being printed on;
   a film layer; and
   a pressure sensitive adhesive that connects a bottom face of the sheet layer to a top face of the film layer.

6. The printable blank sheet of claim 1, wherein the object is capable of being folded into a three-dimensional structure and is at least one of the following: a megaphone, a bottle hanger, a box, a table tent, a cup sleeve or a door hanger.

7. The printable blank sheet of claim 6, wherein the first object has a plurality of scored lines along with the first object can be folded, and a plurality of tabs and die cut lines that can be used to assemble the first object.

8. The printable blank sheet of claim 1, and further comprising:
   a first plurality of cut lines extending through the top substrate and the dry lift adhesive but not through the bottom layer, wherein the object is defined by the first plurality of cut lines.

9. The printable blank sheet of claim 1, and further comprising:

a plurality of perforated lines, wherein the coupon is defined by the plurality of perforation lines.

10. A printable blank sheet of material comprising:
a sheet with a top substrate and a bottom layer that is configured to be run through a printer;
a dry lift adhesive connecting the top substrate to the bottom layer, wherein the dry lift adhesive extends across an entirety of the sheet;
at least one set of cut lines in the sheet that extend through the top substrate and the dry lift adhesive but not through the bottom layer;
a first object with an intricate shape cut into the top substrate, wherein a periphery of the first object is defined by the at least one set of cut lines;
an excess sheet area surrounding the first object in the sheet; and
a second object cut into the top substrate, wherein a periphery of the second object is defined by a plurality of perforated lines, and wherein the second object is superimposed on and integrally formed with the first object; and
wherein the first object and the second object can be removed from the sheet by separating the first object and the second object from the bottom layer along the dry lift adhesive.

11. The printable blank sheet of claim 10, further comprising a notch cut into an edge of the sheet.

12. The printable blank sheet of claim 10, wherein the second object is a rectangle or an oval.

13. The printable blank sheet of claim 12, wherein the second object is a coupon.

14. The printable blank sheet of claim 10, wherein the bottom layer of the sheet is a film layer.

15. The printable blank sheet of claim 10, wherein the top substrate further comprises:
a sheet layer that is capable of being printed on;
a film layer; and
a pressure sensitive adhesive that connects a bottom face of the sheet layer to a top face of the film layer.

16. The printable blank sheet of claim 10, wherein the first object is capable of being assembled into a three-dimensional structure and is at least one of the following: a megaphone, a bottle hanger, a box, a table tent, a cup sleeve, or a door hanger.

17. The printable blank sheet of claim 16, wherein the first object has a plurality of scored lines along which the first object can be folded, and a plurality of tabs and die cut lines that can be used to assemble the first object.

* * * * *